US010632877B2

(12) United States Patent
Kondo et al.

(10) Patent No.: US 10,632,877 B2
(45) Date of Patent: Apr. 28, 2020

(54) VEHICLE SEAT

(71) Applicant: TOYOTA JIDOSHA KABUSHIKI KAISHA, Toyota-shi (JP)

(72) Inventors: Keiichi Kondo, Chiryu (JP); Kazuyuki Shiga, Nissin (JP); Kento Yoshida, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/181,396

(22) Filed: Nov. 6, 2018

(65) Prior Publication Data

US 2019/0152362 A1 May 23, 2019

(30) Foreign Application Priority Data

Nov. 21, 2017 (JP) .................................. 2017-223749

(51) Int. Cl.
*B60N 2/56* (2006.01)
*A47C 7/74* (2006.01)

(52) U.S. Cl.
CPC ........... *B60N 2/565* (2013.01); *B60N 2/5657* (2013.01); *A47C 7/744* (2013.01)

(58) Field of Classification Search
CPC ............................. B60N 2/565; B60N 2/5657
USPC ........................................ 297/180.13, 180.14
See application file for complete search history.

(56) References Cited

U.S. PATENT DOCUMENTS

| 6,105,667 A | 8/2000 | Yoshinori et al. |
| 6,277,023 B1 * | 8/2001 | Schwarz ............... B60N 2/5635 297/180.14 |
| 6,848,742 B1 | 2/2005 | Aoki et al. |
| 9,695,828 B2 * | 7/2017 | Helmenstein ........... F04D 17/16 |
| 2010/0066133 A1 * | 3/2010 | Benton .............. B60H 1/00264 297/180.14 |
| 2012/0315132 A1 * | 12/2012 | Axakov ................ B60N 2/5635 415/182.1 |
| 2016/0144754 A1 * | 5/2016 | Bauer .................. B60N 2/5642 297/452.47 |
| 2017/0028886 A1 * | 2/2017 | Zhang .................... B60N 2/565 |

FOREIGN PATENT DOCUMENTS

| JP | 11-254938 | 9/1999 |
| JP | 2003-285628 | 10/2003 |
| JP | 2008-179264 | 8/2008 |

\* cited by examiner

*Primary Examiner* — Rodney B White
(74) *Attorney, Agent, or Firm* — Oblon, McClelland, Maier & Neustadt, L.L.P.

(57) ABSTRACT

A vehicle seat includes: a seat main body including a seat face side at which occupant sits; a blower device provided at the seat main body and that blows air when operated; an exhaust portion provided at the seat main body and that exhausts air blown from the blower device to the seat face side of the seat main body; an intake portion provided at the seat main body and that takes in air; and a suction device provided at the seat main body and that takes in air through the intake portion when operated, and the suction device forming an air current at the seat face side of the seat main body at a vicinity of the seat occupant, the air current including at least a portion of air that is exhausted to an outer side of the seat main body from the exhaust portion.

6 Claims, 2 Drawing Sheets

VEHICLE SEAT

CROSS-REFERENCE TO RELATED APPLICATION

This application claims priority under 35 USC 119 from Japanese Patent Application No. 2017-223749, filed on Nov. 21, 2017, the disclosure of which is incorporated by reference herein.

BACKGROUND

Technical Field

The present invention relates to a seat for a vehicle.

Related Art

A vehicle seat air conditioning device is known (for example, see Japanese Patent Application Laid-Open (JP-A) No. 2008-179264) in which a vehicle cabin interior air conditioning unit is capable of blowing an air conditioning wind inside a vehicle cabin, some or all of the air conditioning wind generated by the vehicle cabin interior air conditioning unit is supplied to the lower side of a seat cushion of a seat, and the air conditioning wind is exhausted through exhaust apertures provided in both the seat cushion and a seat back of the seat.

In this structure, in order to supply the air conditioning wind to the lower side of the seat cushion, a floor duct or the like must be provided at the lower side of the seat cushion or in a vicinity region thereof. Therefore, space for disposing a floor duct or the like in the surroundings of the seat is required.

SUMMARY

The present disclosure provides a vehicle seat that may cause an air current to flow in a vicinity of the body of a seat occupant without specifically requiring space in the surroundings of a seat main body.

A first aspect of the present disclosure is a vehicle seat including: a seat main body including a seat face side at which a seat occupant sits; a blower device provided at the seat main body, the blower device blowing air when operated; an exhaust portion provided at the seat main body, the exhaust portion exhausting air blown from the blower device to the seat face side of the seat main body; an intake portion provided at the seat main body, the intake portion capable of taking in air; and a suction device provided at the seat main body, the suction device taking in air through the intake portion when operated, and the suction device forming an air current at the seat face side of the seat main body at a vicinity of the seat occupant, the air current including at least a portion of air that is exhausted to an outer side of the seat main body from the exhaust portion.

In the vehicle seat according to the first aspect of the present disclosure, as a result of operation of the blower device, air is exhausted to the outer side of the seat main body through the exhaust portion of the seat main body. In a case in which the suction device operates in this state, at least a portion of the air exhausted to the outer side of the seat main body through the exhaust portion is taken in through the intake portion of the seat main body. Thus, an air current is formed at the seat face side of the seat main body in a vicinity of a seat occupant sitting on the seat main body.

The blower device, the suction device, the exhaust portion and the intake portion are all provided in the seat main body. Therefore, the exhaust portion, the intake portion and the like need not be connected to structures external to the seat main body in order to form the above-mentioned air current, such as, for example, an air conditioning device or the like mounted in the vehicle, and space need not be provided for such connections in the surroundings of the seat main body.

Note that, in the present disclosure, the blower device and the suction device may be formed separate, or may be formed integrated.

In a second aspect of the present disclosure, in the first aspect, the seat main body may include a seat cushion and a seat back, the seat cushion including a sitting surface on which the seat occupant sits, the seat back supporting the back area of the seat occupant, and the blower device, the intake portion, the suction device and the exhaust portion may be provided at one of the seat cushion or the seat back.

In the vehicle seat according to the second aspect of the present disclosure, all of the blower device, the exhaust portion, the suction device and the intake portion are provided in one of the seat cushion or the seat back. Therefore, structures for connecting each of the blower device, the exhaust portion, the suction device and the intake portion in order to cause air to flow may be simplified.

In a third aspect of the present disclosure, in the first aspect or the second aspect, the seat main body may include a seat side portion provided at a seat width direction outer side region of the seat main body, the seat side portion protruding further to the seat face side than a seat width direction middle side region of the seat main body, and the air current may flow from the seat face side toward a seat reverse side along a seat width direction inner side of the seat side portion, and at least a portion of the air exhausted to the outer side of the seat main body from the exhaust portion may merge with the air current at the seat face side of the seat side portion.

According to the vehicle seat of the third aspect of the present disclosure, the seat side portion that protrudes to the seat face side relative to the seat width direction middle side region of the seat main body is provided at the seat width direction outer side region of the seat main body. The air current formed by of the suction device flows along the seat width direction inner side of the seat side portion from the seat face side toward the seat reverse side of the seat side portion, which is at the opposite side of the seat side portion from the seat face side thereof At least a portion of the air exhausted to the outer side of the seat main body from the exhaust portion merges with the air current at the seat face side of the seat side portion. Thus, the air current may be caused to flow at the sides of the body of the seat occupant.

In a fourth aspect of the present disclosure, in the third aspect, the exhaust portion may be disposed at the seat reverse side at the seat width direction outer side of the seat side portion, and the exhaust portion may exhaust air toward the seat face side along a seat width direction outer side surface of the seat side portion.

In the vehicle seat according to the fourth aspect of the present disclosure, the air exhausted from the exhaust portion is exhausted from the seat reverse side at the seat width direction outer side of the seat side portion toward the seat face side along the seat width direction outer side surface of the seat side portion, and merges with the air current at the seat face side of the seat side portion. The exhaust portion is provided in a seat reverse side region at the seat width direction outer side of the seat side portion. Therefore, effects of the exhaust portion being provided at the seat main body on members disposed inside the seat main body at the seat side portion and the like may be suppressed.

In a fifth aspect of the present disclosure, in the fourth aspect, a seat face side end of the seat side portion may guide air exhausted from the exhaust portion along the seat face side end toward the inner side of the seat side portion.

In the vehicle seat according to the fifth aspect of the present disclosure, the seat face side end of the seat side portion may guide the air exhausted from the exhaust portion along the seat face side end to the inner side of the seat side portion. Therefore, even though no dedicated guide member for guiding air toward the seat inner side is provided at the seat face side of the seat side portion, the air exhausted from the exhaust portion tends to merge with the air current at the seat face side of the seat side portion.

In a sixth aspect of the present disclosure, in the fourth aspect or the fifth aspect, a seat face side end of the seat side portion may be curved with a center of curvature thereof being at the seat reverse side relative to the seat face side end.

In the vehicle seat according to the sixth aspect of the present disclosure, the seat face side end of the seat side portion is curved with the center of curvature at the seat reverse side relative to the seat face side. Therefore, the air that is exhausted from the exhaust portion and flows along the seat width direction outer side surface of the seat side portion tends to flow toward the inner side of the seat side portion along the seat face side end because of the Coanda effect. Therefore, the air exhausted from the exhaust portion tends to merge with the air current at the seat face side of the seat side portion.

In a seventh aspect of the present disclosure, in the first to sixth aspects, the air current may flow from a seat width direction outer side toward a seat width direction middle side of the seat main body, and at least a portion of the air exhausted to the outer side of the seat main body from the exhaust portion may merge with the air current at the seat width direction outer side of the seat main body.

In the vehicle seat according to the seventh aspect of the present disclosure, the air current formed by operation of the blower device flows from the seat width direction outer side of the seat main body toward the seat width direction middle side, and at least a portion of the air exhausted to the outer side of the seat main body from the exhaust portion merges with the air current at the seat width direction outer side of the seat main body. Therefore, the air current may be caused to flow to the seat reverse side of a seat reverse side region of the body of the seat occupant (for example, the back area of the seat occupant, the buttock area of the seat occupant or the like).

According to the above aspects, the vehicle seat of the present disclosure may cause an air current to flow in a vicinity of the body of a seat occupant without specifically requiring space in the surroundings of a seat main body.

BRIEF DESCRIPTION OF THE DRAWINGS

Exemplary embodiment will be described in detail based on the following figures, wherein.

DETAILED DESCRIPTION

Figure 1:
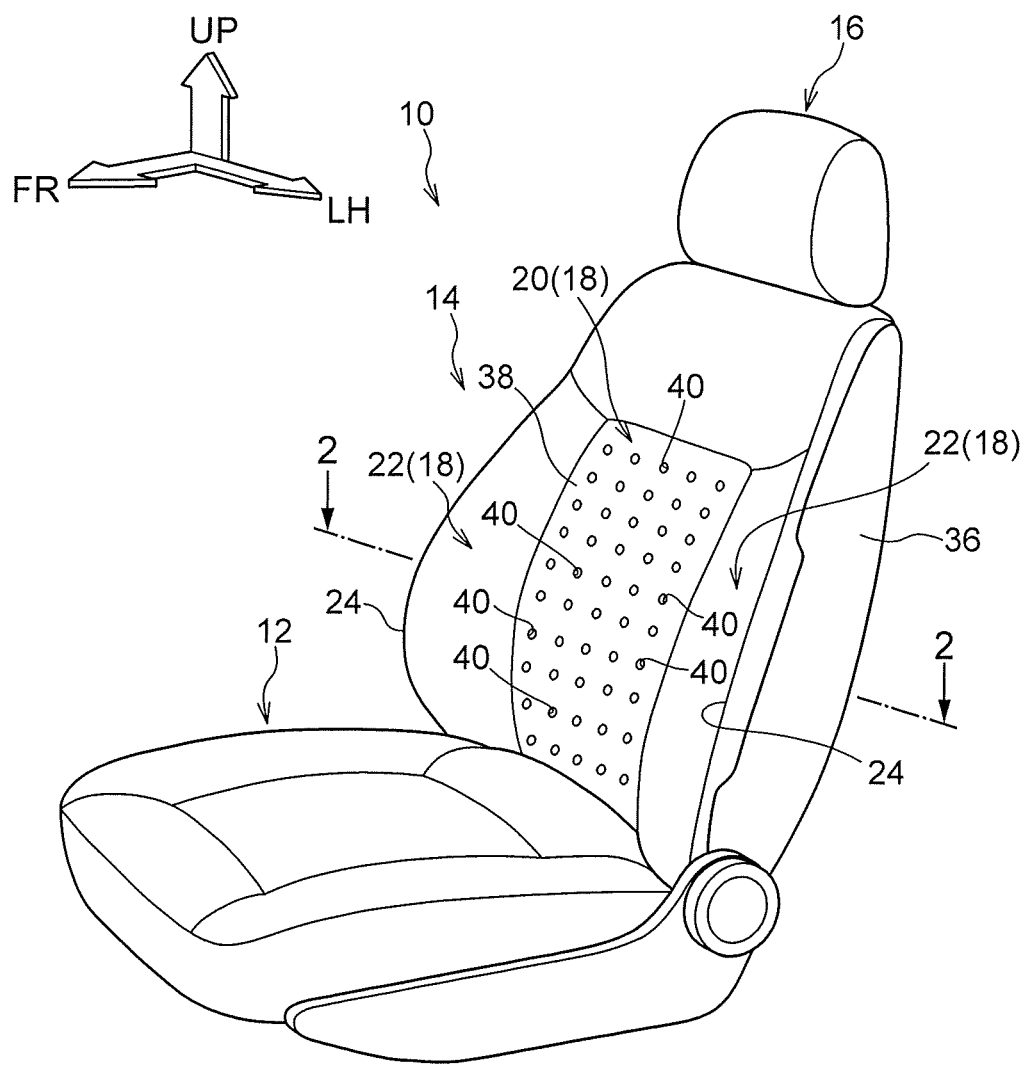
FIG. 1 is a perspective view of a vehicle seat according to an exemplary embodiment of the present disclosure.

Now, an exemplary embodiment of the present disclosure is described with reference to FIG. 1 and FIG. 2. The arrow FR in the drawings indicates a seat front side (seat front-and-rear direction front side) of a vehicle seat 10 according to the exemplary embodiment of the present disclosure. The arrow UP indicates a seat upper side (seat vertical direction upper side) of the vehicle seat 10, and the arrow LH indicates a seat width direction left side (seat left-and-right direction left side) of the vehicle seat 10.

As shown in FIG. 1, the vehicle seat 10 is provided with a seat cushion 12 that serves as a seat main body, a seat back 14 that also serves as the seat main body, and a headrest 16. The seat cushion 12 structures a sitting surface region of the vehicle seat 10. A seat occupant S sits on the seat upper side (a seat face side) of the seat cushion 12. A thickness direction of the seat cushion 12 is in the seat vertical direction (the direction of arrow UP in FIG. 1 and the like, and the opposite direction thereto).

The seat back 14 is provided at the seat rear side of the seat cushion 12 (the side in the opposite direction from arrow FR in FIG. 1 and the like). The seat back 14 structures a back portion of the vehicle seat 10. The seat back 14 may support the back area of the seat occupant sitting on the seat cushion 12 from the seat rear side (seat reverse side). A thickness direction of the seat back 14 is approximately in the seat front-and-rear direction (the direction of arrow FR in FIG. 1 and the like, and the opposite direction thereto). However, if the seat back 14 is structured to be tiltable in the seat front-and-rear direction about a seat lower side end portion vicinity of the seat back 14 (that is, if the vehicle seat 10 is equipped with a reclining mechanism) the thickness direction of the seat back 14 varies depending on the turning position of the seat back 14. The headrest 16 is provided at the seat upper side of the seat back 14 and may support the head area of the seat occupant S sitting on the vehicle seat 10 from the seat rear side thereof.

The seat back 14 is provided with a seat pad 18. The seat pad 18 is provided with a pad middle side portion 20. Pad side portions 22 that each serve as a seat side portion are provided at seat width direction outer sides of the pad middle side portion 20. Each pad side portion 22 protrudes to the seat front side (seat face side) relative to the pad middle side portion 20. A pad front side end 24 serves as a seat face side end of the pad side portion 22 that serves as the seat side portion. The pad front side end 24 is curved, so as to bulge to the seat front side, with a center of curvature at a predetermined position at the seat rear side (seat reverse side) relative to the pad front side end 24.

Figure 2:
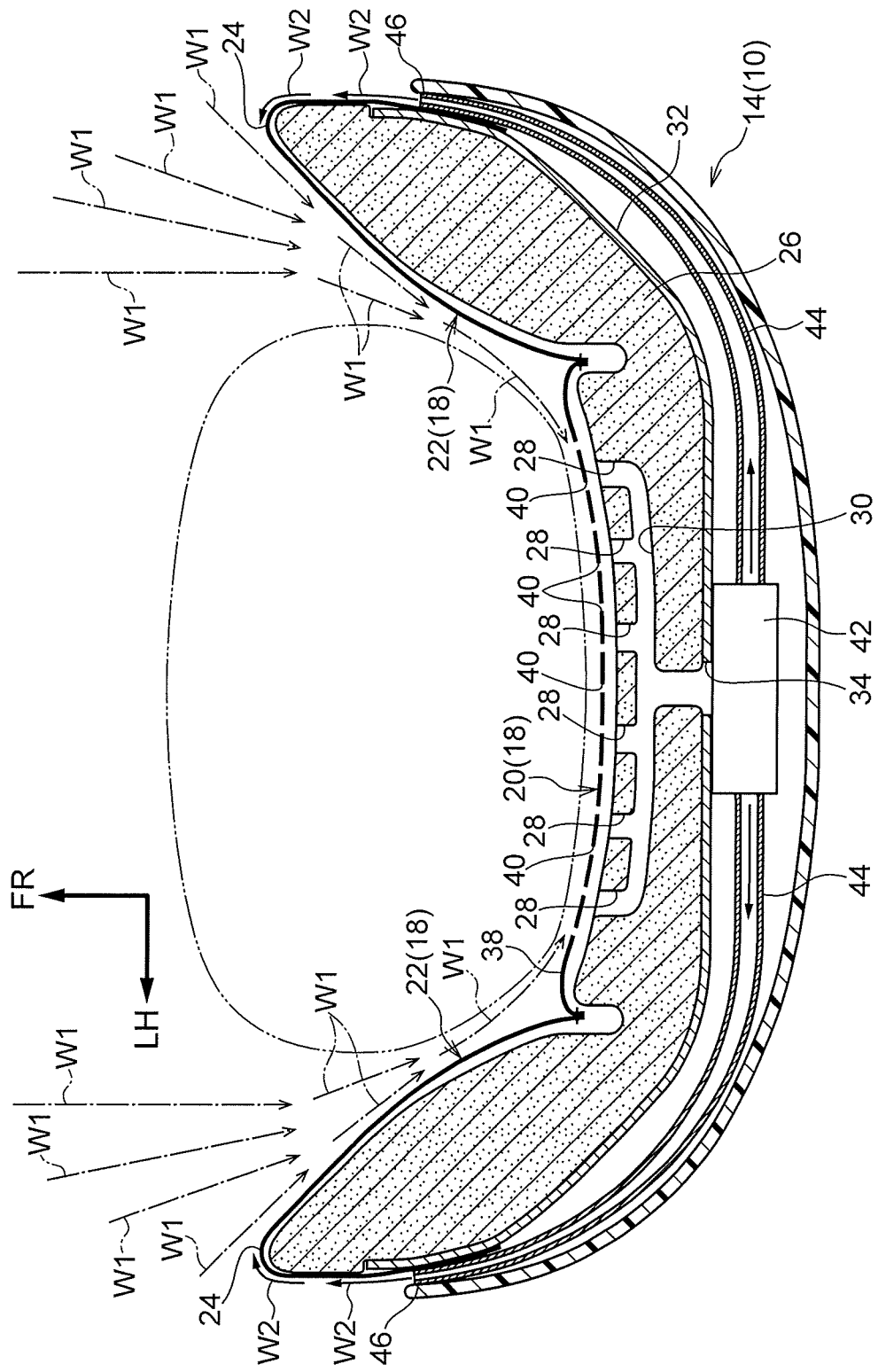
FIG. 2 is a sectional diagram of the seat back of the vehicle seat cut along line 2-2 in FIG. 1.

As shown in FIG. 2, the seat pad 18 is provided with a pad main body 26 that serves as a cushion member. The pad main body 26 is formed in a thick plate shape of a synthetic resin material or the like featuring resilience, such as, for example, a polyurethane foam (foamed polyurethane) or the like. Slit portions 28 that structure an intake portion are provided in a region of the pad main body 26 that structures the pad middle side portion 20. The slit portions 28 are formed at the seat front side (seat face side) relative to a seat front-and-rear direction (thickness direction) middle portion of the pad main body 26. Length directions of the slit portions 28 are in the seat vertical direction, the seat width direction, radiating directions centered on a predetermined region of the pad middle side portion 20, or the like. Seat front side ends (seat face side ends) of the slit portions 28 open in a seat front side surface (seat face side surface) of the pad main body 26.

A ventilation portion 30 that structures the intake portion together with the slit portions 28 is provided in a region of the pad main body 26 that structures the pad middle side portion 20. The ventilation portion 30 is formed at the seat rear side (seat reverse side) relative to the seat front-and-rear direction middle portion of the pad main body 26. A seat front side end (seat face side end) of the ventilation portion 30 is connected with the slit portions 28. Thus, air flowing from the seat front side of the pad main body 26 and entering to the inside of the slit portions 28 may pass through the slit portions 28 and flow into the ventilation portion 30. Meanwhile, a seat rear side end (seat reverse side end) of the ventilation portion 30 opens at a predetermined position of a seat rear side surface (seat reverse side surface) of the pad main body 26. Thus, the air entering the ventilation portion 30 through the slit portions 28 may exit to the seat rear side of the pad main body 26 through the seat rear side end of the ventilation portion 30.

A partition member 32 is provided at the seat rear side (seat reverse side) of the pad main body 26. The partition member 32 is formed in a thin sheet shape or plate shape, with the thickness direction thereof approximately in the vehicle front-and-rear direction. The partition member 32 has lower permeability than the pad main body 26 and may block or suppress flows of air from the side of the partition member 32 at which the pad main body 26 is disposed to the opposite side of the partition member 32.

In the partition member 32, a hole portion 34 that structures the intake portion together with the slit portions 28 and the ventilation portion 30 is provided. The hole portion 34 opposes the seat rear end side end (seat reverse side end) of the ventilation portion 30. Thus, air exiting from the seat rear side end of the ventilation portion 30 toward the seat rear side of the pad main body 26 may flow through the hole portion 34 to the seat rear side of the partition member 32.

A backboard 36 is provided at the seat rear side of the pad main body 26. The backboard 36 is formed by, for example, molding of a synthetic resin material. The pad main body 26 is covered from the seat rear side by the backboard 36, and regions of the pad main body 26 that form the pad side portions 22 of the seat pad 18 are covered from the seat width direction outer sides thereof by the backboard 36.

As shown in FIG. 1 and FIG. 2, the seat pad 18 is provided with a cover 38. The cover 38 is formed of a sheet material with flexibility, of leather, synthetic leather, fabric or the like. The seat front side surface of the pad main body 26, seat outer periphery surfaces arranged in a circumferential direction about an axial direction in the seat front-and-rear direction, and the like are covered by the cover 38. Numerous pores 40 are formed in a region of the cover 38 that corresponds with the pad middle side portion 20 of the seat pad 18. The pores 40 structure the intake portion together with the above-described slit portions 28, ventilation portion 30 and hole portion 34. The pores 40 penetrate through the cover 38 in the seat front-and-rear direction. Thus, air at the seat front side (seat face side) of the cover 38 may flow through the pores 40 to the seat rear side (seat reverse side) of the cover 38, and this air passing through the pores 40 may enter the slit portions 28 of the pad main body 26 shown in FIG. 2.

As shown in FIG. 2, a blower 42 is provided between the partition member 32 and the backboard 36. The blower 42 serves as an air pump device that constitutes both a suction device and a blower device. The blower 42 is connected with the hole portion 34 of the partition member 32 mentioned above. When the blower 42 operates and a fan (not shown in the drawings) that structures the blower 42 is turned, the blower 42 sucks air through the hole portion 34 in the partition member 32. Ducts 44 that serve as a discharge flow portion are provided at both seat width direction sides of the blower 42. Seat width direction inner side end portions of the ducts 44 are connected with seat width direction outer side end portions of the blower 42. The air sucked by the blower 42 is discharged through the seat width direction outer side end portions of the blower 42 and flows into the ducts 44.

A seat width direction outer side end portion of each duct 44 (that is, a portion of the duct 44 at the opposite side thereof from the side at which the blower 42 is disposed) serves as an exhaust portion 46. Each exhaust portion 46 is provided at the seat rear side (seat reverse side) of the seat pad 18 relative to the pad front side end 24 of the corresponding pad side portion 22. Thus, the exhaust portion 46 is disposed between a seat width direction outer side end portion of the backboard 36 and the pad side portion 22 at the seat width direction outer side of the pad side portion 22. The exhaust portion 46 opens approximately toward the seat front side (the seat face side). Therefore, air that is discharged from the blower 42 and flows through the duct 44 is exhausted to the seat front side through the exhaust portion 46. The air that is exhausted from the exhaust portion 46 flows along a seat width direction outer side surface of the pad side portion 22 toward the seat front side, and exits to the outer side of the seat back 14 between the seat width direction outer side end portion of the backboard 36 and the pad side portion 22.

Now, operation of the present exemplary embodiment is described.

In the present exemplary embodiment, when the blower 42 is operated and the fan structuring the blower 42 is turned, air is sucked through the hole portion 34 in the partition member 32. Because of the air at the hole portion 34 being sucked by the blower 42, air in the ventilation portion 30 flows to the side thereof at which the hole portion 34 is disposed, and air in the slit portions 28 flows into the ventilation portion 30. Because of the air in the slit portions 28 flowing to the side thereof at which the ventilation portion 30 is provided, air is taken in through the seat front side ends (seat face side ends) of the slit portions 28, as a result of which air at the seat front side (seat face side) of the cover 38 passes through the pores 40 in the cover 38 and flows into the slit portions 28. Because of the air at the seat front side of the cover 38 being taken in by the pores 40 in the cover 38, a first air current W1, which serves as an air current, is generated at the seat front side of the cover 38. This first air current W1 flows from the seat front side (the seat face side) toward the seat rear side (the seat reverse side) along the seat width direction inner sides of regions of the cover 38 that correspond with the pad side portions 22.

In this state, if, for example, a vehicle air conditioning device disposed to the seat front side of the present vehicle seat 10 is operated and feeds, for example, a cooling wind toward the side thereof at which a seat occupant S is sitting on the vehicle seat 10, the cooling wind merges with the first air current W1. Hence, the cooling wind flows past the sides of seat width direction side portions of the body of the seat occupant S (for example, flank areas of the seat occupant S) along a region at the seat rear side of the body of the seat occupant S (for example, the back area of the seat occupant S).

Therefore, the body of the seat occupant S may be cooled effectively by the cooling wind. Thus, because the body of the seat occupant S may be cooled effectively by the cooling wind, output power of the air conditioning device may be suppressed. As a result, for example, fuel consumption of the vehicle may be improved.

Meanwhile, when the blower 42 is operated, air from the blower 42 is discharged through the seat width direction outer side end portions of the blower 42, flows in the ducts 44, is exhausted from the exhaust portions 46 of the ducts 44 towards the seat front side (the seat face side), and exits to the outer sides of the seat back 14 between the seat width direction outer side end portions of the backboard 36 and the pad side portions 22 of the seat pad 18. Because of this air flowing through the ducts 44 exiting to the outer sides of the seat back 14, a second air current W2 is formed at the seat width direction outer sides of the pad side portions 22. The second air current W2 flows along the seat width direction outer side surfaces of the pad side portions 22 towards the seat front side (the seat face side).

The pad front side end (seat face side end) 24 of each pad side portion 22 is curved so as to bulge toward the seat front side with the center of curvature being at the predetermined position at the seat rear side (the seat reverse side) relative to the pad front side end 24. Therefore, when the second air current W2 flowing along the vehicle width direction outer side surface of the pad side portion 22 reaches the vicinity of the pad front side end 24, the second air current W2 is pulled in toward the pad front side end 24 by the Coanda effect, and flows along the pad front side end 24 toward the seat width direction inner side. Because the second air current W2 flows toward the seat width direction inner side along each pad front side end 24, the second air current W2 merges with the first air current W1. Consequently, the second air current W2 becomes the first air current W1 and flows past the sides of seat width direction side portions of the body of the seat occupant S (for example, the flank areas of the seat occupant S) to the seat rear side of the region at the seat rear side of the body of the seat occupant S (for example, the back area of the seat occupant S).

When the cooling wind from the air conditioning device is sucked in by the blower 42 together with the first air current W1, the second air current W2 becomes a cooling wind. Therefore, a temperature rise of the first air current W1 due to the second air current W2 merging with the first air current W1 may be suppressed, and the cooling wind state of the first air current W1 may be maintained. In addition, because of the second air current W2 merging with the first air current W1, an air quantity of the first air current W1 (for example, density of the air) is raised and the body of the seat occupant S may be cooled more effectively. Therefore, the output power of the air conditioning device may be further suppressed. As a result, for example, the fuel consumption of the vehicle may be further improved.

In the present exemplary embodiment, the blower 42, the exhaust portions 46 and, structuring the intake portion, the pores 40 of the cover 38, the slit portions 28 and ventilation portion 30 in the pad main body 26 of the seat pad 18, and the hole portion 34 in the partition member 32 are all provided at the seat back 14. Therefore, the exhaust portions 46, the intake portion and the like need not be connected to structures external to the vehicle seat 10 such as, for example, the air-conditioning device mentioned above in order to form the above-described first air current W1 and second air current W2. In consequence, a gap between the seat cushion 12 and the floor (a floor portion) of the vehicle may be made smaller, and other devices may be disposed in a seat lower side region of the seat cushion 12.

Furthermore, the blower 42 is provided in the seat back 14 that serves as the seat main body, the first air current W1 is taken into the seat back 14 serving as the seat main body, and the second air current W2 is exhausted from the seat back 14. Therefore, even in a structure in which the seat back 14 is equipped with a reclining function capable of tilting the seat back 14 in the seat front-and-rear direction about the seat lower side end portion of the seat back 14, there is no need to form a structure that alters the ducts 44 and the like in accordance with tilting of the seat back 14, or the like. Therefore, the ducts 44 and the like may be simplified and costs may be lowered.

In the present exemplary embodiment, the exhaust portion 46 of each duct 44 is provided at the seat rear side (the seat reverse side) of the seat width direction outer side of the pad side portion 22 of the seat pad 18. Therefore, even in a case in which, for example, an airbag device is provided inside the pad side portion 22 and a bag body of the airbag device inflates and expands to the seat front side of the pad side portion 22 during a vehicle emergency such as a vehicle collision or the like, the exhaust portion 46 of the duct 44 does not impede placing of the airbag device or inflation and expansion of the bag body. Accordingly, the present exemplary embodiment may be applied to a vehicle seat 10 in which an airbag device is provided inside the pad side portion 22.

In the present exemplary embodiment, as described above, the second air current W2 flows toward the seat width direction inner side and merges with the first air current W1 in a vicinity of the pad front side end 24 of each pad side portion 22 of the seat pad 18 because of the Coanda effect. Therefore, a particular member such as a fan or the like for causing the second air current W2 flowing toward the seat front side to flow toward the seat width direction inner side is unnecessary, and thus, in the present exemplary embodiment, structures may be simplified and costs may be lowered.

In the present exemplary embodiment, the pad front side end 24 of each pad side portion 22 is curved so as to bulge toward the seat front side with the center of curvature at the predetermined position at the seat rear side relative to the pad front side end 24. Therefore, an inclination angle of the pad front side end 24 toward the seat width direction inner side with respect to the seat front side changes gently from the seat width direction outer side of the pad front side end 24 to the seat width direction middle side of the pad front side end 24. Consequently, the second air current W2 is more easily caused to flow toward the seat width direction inner side by the Coanda effect.

In the present exemplary embodiment, a structure is formed in which the blower 42 incorporates the functions of both the suction device that sucks air and the blower device that blows air. However, a structure is possible in which the suction device and blower device are provided as respectively separate bodies.

In the present exemplary embodiment, a structure is formed in which the exhaust portion 46 of each duct 44 is provided at the seat rear side of the seat width direction outer side of the pad side portion 22 of the seat pad 18. However, for example, the disposition location of the exhaust portion 46 may be provided at the pad front side end 24 of the pad side portion 22 and the exhaust direction of air from the exhaust portion 46 may be toward the seat width direction inner side. Namely, a structure may be formed such that the second air current W2 formed by air being exhausted from the exhaust portions 46 to merge with the first air current W1. The disposition locations and the like of the exhaust portion 46 are not particularly limited.

The present exemplary embodiment has a structure in which the exhaust portions 46 are provided at the ducts 44. However, a structure is possible in which a gap between each seat width direction outer side end of the backboard 36 and the seat width direction outer side surface of the pad side portion 22 serves as an exhaust portion, and the duct 44 is not provided but the second air current W2 is formed by the air blown from the blower device (in the present exemplary embodiment, the blower 42) being exhausted through this exhaust portion between the partition member 32 and the backboard 36. Namely, the exhaust portion is not limited to a specific mode unless the exhaust portion exhausts the air blown from the blower device (in the present exemplary embodiment, the blower 42) and form the second air current W2.

In the present exemplary embodiment, the intake portion is formed by: the pores 40 that are formed in the cover 38; the slit portions 28 and ventilation portion 30 that are formed in the pad main body 26; and the hole portion 34 that is formed in the partition member 32. However, if, for example, the cover 38 is formed of a fabric or the like that features sufficient permeability to enable the formation of the first air current W1, the pores 40 need not be formed in the cover 38. Further, a suction duct may be provided between the blower 42 and the hole portion 34 of the partition member 32, and the intake portion may include this suction duct. Namely, the intake portion is not limited to a specific mode, unless the intake portion takes in the first air current W1 at the seat front side (the seat face side) of the seat back 14 and guides to the suction device (in the present exemplary embodiment, the blower 42) when the suction device is operated.

In the present exemplary embodiment, the pad front side end 24 serving as the seat face side end of the pad side portion 22 serving as the seat side portion is curved, so as to bulge toward the seat front side with the center of curvature at the predetermined position at the seat rear side (seat reverse side) relative to the pad front side end 24. However, the seat face side end of the seat side portion may be a flat surface that is substantially parallel to the seat width direction. The seat face side end of the seat side portion is not limited to the curved shape as described above.

The present exemplary embodiment has a structure in which the second air current W2 flows toward the seat width direction inner side at the pad front side end 24 of each pad side portion 22 of the seat pad 18 due to the Coanda effect. However, the second air current W2 may be caused to flow toward the seat width direction inner side at the pad front side end 24 by a fan or the like.

In the present exemplary embodiment, the second air current W2 flows toward the seat front side along the seat width direction outer side surface of each pad side portion 22 of the seat pad 18. It is preferable for the second air current W2 to flow toward the seat front side smoothly. Therefore, it is preferable for the seat width direction outer side surface of the pad side portion 22 to be a smooth surface, at least in a range of the seat width direction outer side surface of the pad side portion 22 along which the second air current W2 passes. Accordingly, a plate-shaped portion or the like that forms a smooth surface at the seat width direction outer side surface may be provided at the pad side portion 22 in the range of the seat width direction outer side surface of the pad side portion 22, along which the second air current W2 passes.

The present exemplary embodiment has a structure in which the seat back 14 is employed as the seat main body. However, the seat main body may be, for example, the seat cushion 12. When the seat cushion 12 is employed as the seat main body, the seat upper side serves as the seat face side and the seat lower side serves as the seat reverse side.

The present exemplary embodiment has a structure in which air taken into the seat back 14 by operation of the blower 42 is exhausted from the seat back 14 side of the vehicle seat 10. However, air taken in through one or both of the seat back 14 and the seat cushion 12 by operation of the blower 42 may be exhausted from one or both of the seat back 14 and the seat cushion 12.

What is claimed is:

1. A vehicle seat comprising:
a seat main body including a seat face side at which a seat occupant sits;
a blower device provided at the seat main body, the blower device blowing air when operated;
an exhaust portion provided at the seat main body, the exhaust portion exhausting air blown from the blower device to the seat face side of the seat main body;
an intake portion provided at the seat main body, the intake portion capable of taking in air; and
a suction device provided at the seat main body, the suction device taking in air through the intake portion when operated, and the suction device forming an air current at the seat face side of the seat main body at a vicinity of the seat occupant, the air current including at least portion of air that is exhausted to an outer side of the seat main body from the exhaust portion,
wherein the seat main body includes a seat side portion provided at a seat width direction outer side region of the seat main body, the seat side portion protruding further to the seat face side than a seat width direction middle side region of the seat main body, and
the air current flows from the seat face side toward a seat reverse side along a seat width direction inner side of the seat side portion, and at least a portion of the air exhausted to the outer side of the seat main body from the exhaust portion merges with the air current at the seat face side of the seat side portion.

2. The vehicle seat according to claim 1, wherein the seat main body includes a seat cushion and a seat back, the seat cushion including a sitting surface on which the seat occupant sits, the seat back supporting the back area of the seat occupant, and
the blower device, the intake portion, the suction device and the exhaust portion are provided at one of the seat cushion or the seat back.

3. The vehicle seat according to claim 1, wherein the exhaust portion is disposed at the seat reverse side at the seat width direction outer side of the seat side portion, and the exhaust portion exhaust air toward the seat face side along a seat width direction outer side surface of the seat side portion.

4. The vehicle seat according to claim 3, wherein a seat face side end of the seat side portion guides air exhausted from the exhaust portion along the seat face side end toward the inner side of the seat side portion.

5. The vehicle seat according to claim 3, wherein a seat face side end of the seat side portion is curved with a center of curvature thereof being at the seat reverse side relative to the seat face side end.

6. The vehicle seat according to claim 1, wherein the air current flows from a seat width direction outer side toward a seat width direction middle side of the seat main body, and at least a portion of the air exhausted to the outer side of the seat main body from the exhaust portion merges with the air current at the seat width direction outer side of the seat main body.

* * * * *